(No Model.) 3 Sheets—Sheet 1.
L. A. AUMANN, J. W. CUMNOCK & G. W. STAFFORD.
SHEDDING MECHANISM FOR LOOMS.

No. 437,472. Patented Sept. 30, 1890.

WITNESSES: INVENTORS (No Model.) 3 Sheets—Sheet 2.

L. A. AUMANN, J. W. CUMNOCK & G. W. STAFFORD.
SHEDDING MECHANISM FOR LOOMS.

No. 437,472. Patented Sept. 30, 1890.

WITNESSES:
James E Arnold
H A Shove

INVENTORS
Louis A Aumann
James W Cumnock
Geo W Stafford
By Benj Arnold ATTORNEY (No Model.) 3 Sheets—Sheet 3.
L. A. AUMANN, J. W. CUMNOCK & G. W. STAFFORD.
SHEDDING MECHANISM FOR LOOMS.
No. 437,472. Patented Sept. 30, 1890.
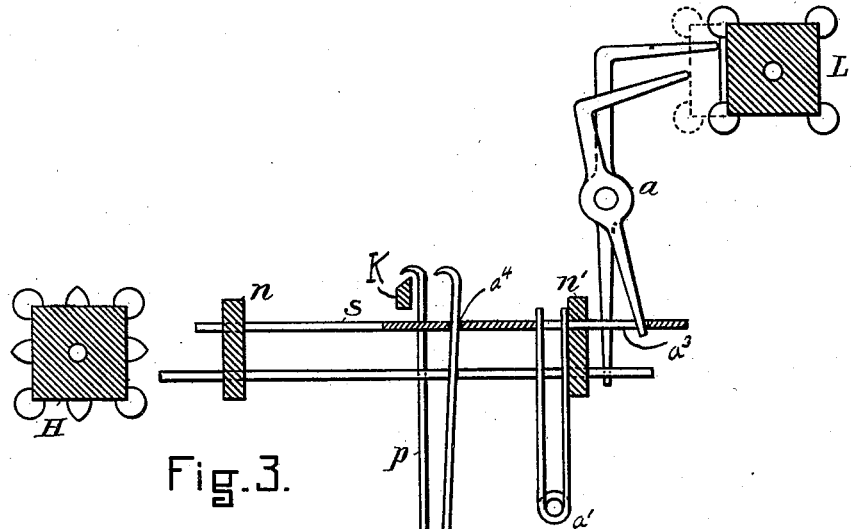
Fig. 3.
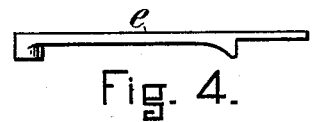
Fig. 4.
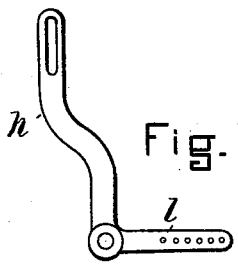
Fig. 5.
Fig. 6.
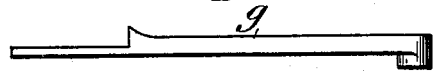
Fig. 7.
WITNESSES.
Albert L. Bodwell.
H. A. Shove
INVENTOR
Louis A. Aumann
J. W. Cumnock
Geo. W. Stafford
By Benj. Arnold ATTORNEY

UNITED STATES PATENT OFFICE.

LOUIS A. AUMANN AND JAMES W. CUMNOCK, OF CHICOPEE, MASSACHUSETTS, AND GEORGE W. STAFFORD, OF PROVIDENCE, RHODE ISLAND.

SHEDDING MECHANISM FOR LOOMS.

SPECIFICATION forming part of Letters Patent No. 437,472, dated September 30, 1890.

Application filed October 18, 1889. Serial No. 327,391. (No model.)

*To all whom it may concern:*

Be it known that we, LOUIS A. AUMANN and JAMES W. CUMNOCK, of Chicopee, Hampden county, Massachusetts, and GEORGE W. STAFFORD, of Providence, in the county of Providence and State of Rhode Island, have invented certain new and useful Improvements in Shedding Mechanism for Looms; and we do hereby declare that the following is a full, clear, and exact description thereof, reference being had to the accompanying drawings, and to the letters of reference marked thereon, which form a part of this specification.

This invention refers to that class of Jacquard attachments for looms in which two pattern-cylinders and pattern-chains are used for the purpose of combining two patterns of two different designs, one of which requires to be repeated, or for a combination of plain body work with an ornamental design for border or intermediate part, with the advantage of being able to use a much smaller number of cards to produce the same effect. It is fully illustrated in the accompanying drawings.

Figure 1:
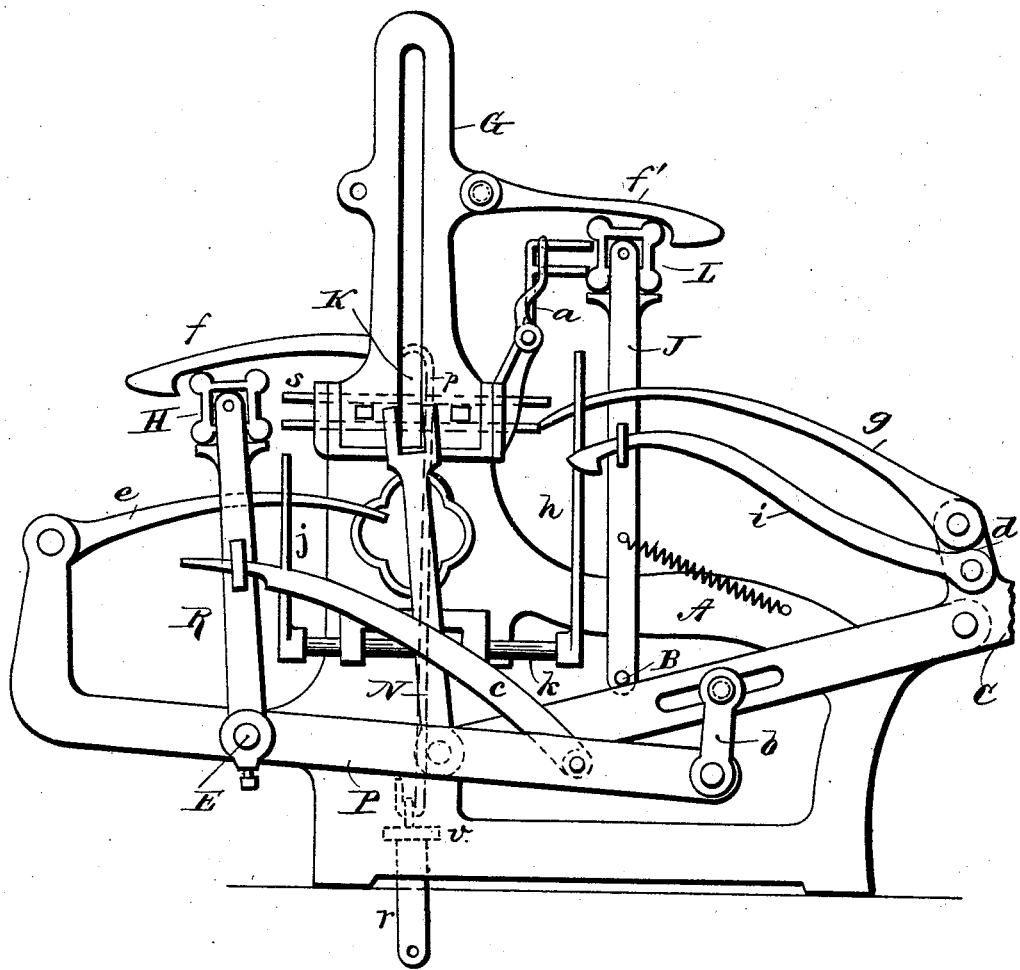
Figure 2:
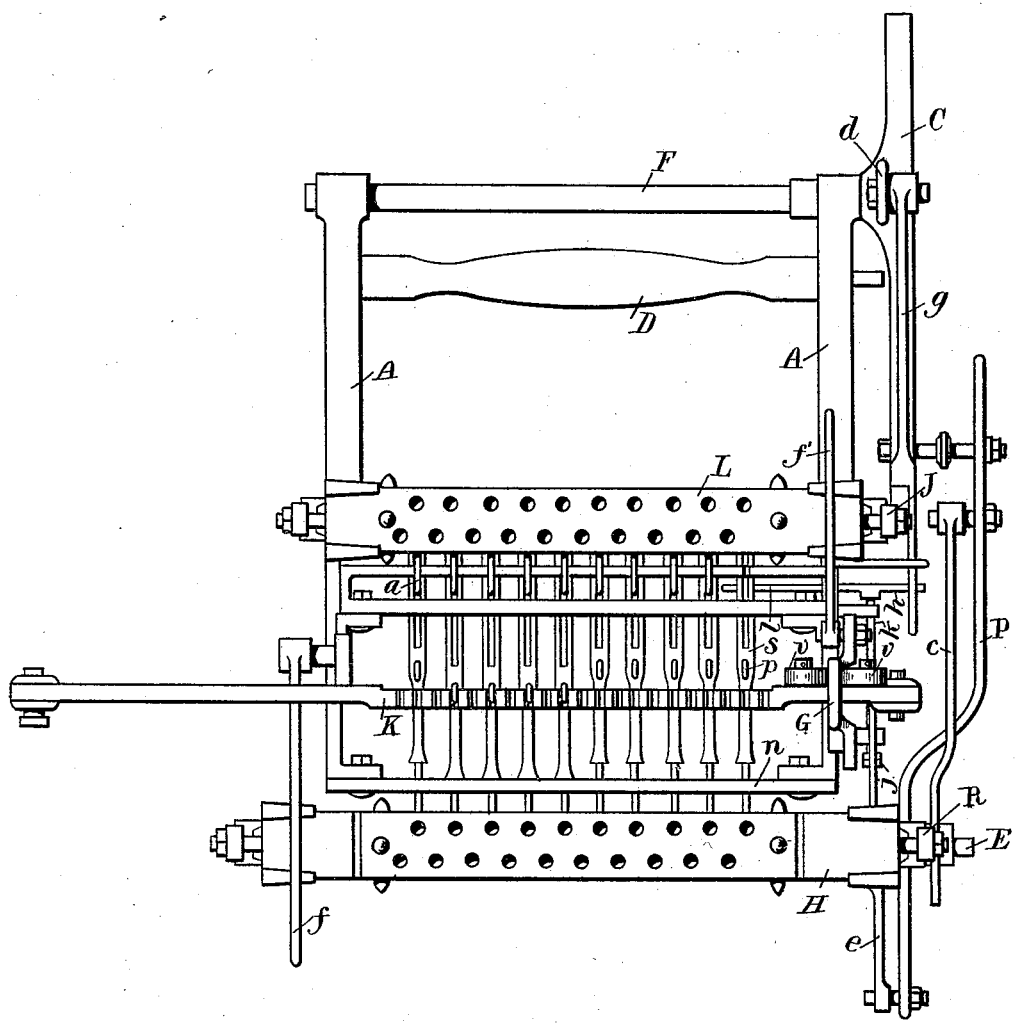

Figure 1 shows a side elevation of the attachment. Fig. 2 is a top view of the same. Fig. 3 is a vertical section of a part of the mechanism, showing the pattern-cylinders and the hooks with the needles, and the levers whereby the same needles are actuated by either of the cylinders and their cards when required. Figs. 4, 5, 6, and 7 show parts of the mechanism separately, as will be hereinafter explained.

The operating mechanism of the attachment is held between two side frames of the same shape. The two frames A A are held at a proper distance apart by bars, one of which is shown at D, the others being covered by the mechanism.

A rocker-shaft F is held in bearings in the ends of the side frames A to carry the main working-lever C, which is attached to the front end of the shaft outside of the frame. Two other shafts B and E also have bearings in the side frames, the former in a part of the frame projecting down back of the arm J to carry the two pattern-cylinders H and L, which are held in bearings in the upper ends of the arms R J, respectively, the arms being made fast on the outer end of those shafts.

The frame-work $n\ n'$, that holds the pattern-needles $s$ and hooks $p$, is held between the two side frames A at about the level of the cylinder H when in, the other cylinder L being placed higher up to make room for the levers $a$ to operate the pattern-needles from that end by that cylinder.

A lifting-bar K is placed across the machine over the pattern-needles parallel with the cylinders and pivoted at the rear end by a link to the end of an arm under it, which projects out from the farther side frame. The bar K is pivoted at its front end to a connecting-bar N, the lower end of which is attached to the inner end of the working-lever C, from which it receives its motion. The said bar K is guided at the front end to insure its rising vertically by a slotted plate G, and friction-rolls $v\ v$ are attached to the bar on each side of the plate to prevent end motion. A lever P is hung to work freely on the shaft E, and it receives its motion from working-lever C by means of a link $b$, which is pivoted at one end by a stud to the bar C and at the other end by a similar stud to the end of the lever P.

The lever P is for the purpose of moving the arms R and their pattern-cylinder H to and from the pattern-needles $s$. The parts that do this are, first, the bar $c$, which is pivoted at one end to the lever P, and is held in a clasp on the arm R at its other end, which pushes back the arm R, by a shoulder near that end which strikes against the lower side of the clasp. The arms R and cylinder H are thrown in toward the needles by the bar $e$, pivoted to the outer end of the lever P, by a projection on its outer side, (see Fig. 4,) which strikes against the outer edge of the arm R. An extension $d$ on the upper side of the lever C carries similar parts for moving the arms J and cylinder L to and from the lever $a$. These parts are, first, the hooked bar $i$, attached to the extension $d$ on the lever C, and held at its other end by a clasp on the arm J. It has a hooked end that catches on the bottom of the clasp and pulls back the arm J and the cylinder away from the pattern-needles.

The arm J is pushed in toward the needles by the bar $g$, pivoted at one end to the upper end of the same extension $d$ by a projection on the inner side of it near the end. (See Fig. 6.) The cylinders are turned a quarter-turn when moved back by hooks, the cylinder L being turned by the hook $f'$, which is attached to the plate G, the hook catching on the head of the cylinder and turning it as it moves back, and the hook $f$, pivoted to a plate bolted to the side frame, turns the cylinder H in like manner.

The bars $g$ and $e$, that push the cylinders in, are guided and controlled in their operation by the vertical arms $h$ and $j$, which are attached to the ends of a short horizontal shaft $k$ held in bearings attached to the side frames. The arm $j$ moves the bar $e$, which passes through a slot in its upper end, and the arm $h$, (see Fig. 5,) which also has a slot in its upper end which the bar $g$ passes through, moves that bar in toward the arm J and away from it, both bars $e$ and $g$ being allowed a sideway motion on their pivots for that purpose. The shaft $k$, carrying these arms, is moved by a horizontal arm $l$, attached to the arm $h$, which is connected to an indicator like that described in application, Serial No. 327,592, attached to the loom to determine the time for making the changes.

The pattern-needles $s$ are held in holes in the bars $n\ n'$, the holes in the latter bar being made rectangular to receive the flattened portions of the needles, which are slotted, as at $a^3$, to receive the lower ends of the needle-levers $a$ and the springs $a'$, that push the needles back to place after they have been operated by one of the pattern-cylinders. The needle-levers $a$ are a series of vertical levers held on a bar passing through a hole in the middle of each lever. The number of them is the same as that of the needles which they move. The levers $a$ are carried up and bent over to from horizontal pins at their tops, and every alternate lever has its pin so as to range level with the upper row of holes in the cylinder L, and its lower leg carried down far enough to pass through the slot in one of the lower row of needles $s$; but the intermediate needle-levers $a$ have their upper ends made level with the lower row of holes in the same cylinder, and their lower ends are extended down through the slots in the upper row of needles $s$. The needles $s$ have each a hole made vertically through its middle in the flattened portion, through which the hooks $p$ pass up, and each hook has its upper end bent over to form a hook to catch over the lifting-lever $k$. (See Fig. 3.) The lower parts of the hooks $p$ extend down and form hooks to catch into the eyes of small flat bars $r$, to the lower ends of which the harness-cords are attached. These bars $r$ are held in slots made in a flat bar V, fastened at its ends to the side frames, and they have shoulders made on them just below the eyes to prevent them from dropping through the bar V, that the hooks $p$ may come to a rest in descending in time to free their hooks from the lifting-bar $k$, if desired.

In operation a reciprocating motion up and down is given to the working-lever C by a connection with the loom, and this gives an up-and-down motion to the lifting-lever K by the connecting-bar N, attached to its inner end, and at the same time gives motion to the lever P, which moves the bars $c\ e$. Now if the indicator-connection draws down on the horizontal arm $l$ of the lever $h$ that lever will throw in the bar $g$, so that its projection will on the upward motion of the lever C push the arms J and cylinder L in toward the projecting end of needle-levers $a$, and if the card on the presented face of the cylinder L has spaces not punched out the ends of the levers $a$, opposite to those blank spaces, will be prevented from entering the holes in the cylinder and be pushed back, causing their lower ends to draw back the needles and hooks $p$, connected with them, so that the lifting-lever K will not catch their hooks when it rises, but will leave them down while it raises all the hooks of those needles whose levers $a$ have at their upper ends entered holes in the cylinder through the holes punched in the card and the harnesses connected to them. Then by an upward motion of the working-lever C the lever K is raised with the hooks caught on it and their harnesses, and the bar $i$ will draw back the cylinder L, which is turned a quarter-turn by its hook $f'$, as described, to present another card to the levers $a$. To change the pattern-cylinders, the arm $l$, being moved or allowed to move up, will throw out the arm $h$ and bar $g$, and the arm $j$ will throw the bar $e$ against the arm R, so that its projection will push that arm and its cylinder H in toward the hooks $p$, and, as before, those needles that do not find holes in the card on the cylinder will be pushed back and carry their hooks off of the lifting-bar, so that they will not be lifted by the bar K on the next upward motion of the lever C, which pushes back the arm R and cylinder H, giving the latter a quarter-turn by means of the hook $f$, as before explained. Fig. 7 shows one of the leveling-plates with which each cylinder is provided to prevent it from turning too easily and so be liable to get out of place.

Having thus described our improvements, what we claim as our invention is—

1. The combination of the needles having slots in a portion of their lengths to receive springs and operated at one end by one of a pair of pattern-cylinders with said springs, a series of angle-levers connected with the opposite ends of said needles and operated at their bent ends by the other one of the pair of the pattern-cylinders, with hooks and lifter-bar to operate the harnesses, and pattern-cylinders H L, substantially as set forth.

2. The two pattern-cylinders H L and standards R J, in combination with the hooks $f\ f'$, springs $a'$, slotted needles $s$, hooks $p$, levers $a$, lifter-bar K, and means to operate said lifter-bar K and to move the pattern-cylinders in and out, substantially as set forth.

3. The combination of the two pattern-cylinders and their standards R J, levers C P, hook $i$, presser-bars $c$ $e$ $g$, springs $a'$, needles $s$, and levers $a$, substantially as herein set forth.

4. The combination of two pattern-cylinders and their standards R J, levers C P, with hook $i$, presser-bars $c$ $e$ $g$, and rocker-shaft $k$, with arms $h$ $j$, substantially as and for the purpose set forth.

5. The combination of two pattern-cylinders placed at the opposite ends of the needles with the levers C P, standards R J, hook $i$, presser-bars $c$ $e$ $g$, shaft $k$, arms $h$ $j$ $l$, hooks $p$, lever $a$, and lifter-bar K, substantially as and for the purpose specified.

6. The slotted needles $s$, springs $a'$, bars $n$ $n'$, hooks $p$, levers $a$, and lifter-bar K, in combination with two pattern-cylinders constructed and operating substantially as described.

LOUIS A. AUMANN.
J. W. CUMNOCK.
GEO. W. STAFFORD.

Witnesses:
   CHARLES H. POLAND,
   S. J. CORDNER.